United States Patent Office 2,757,201
Patented July 31, 1956

2,757,201

PROCESS FOR PRESSURE OXIDATION OF THE LOWER MEMBERS OF THE PARAFFINE SERIES

Paul Nashan, Oberhausen-Sterkrade, Germany, assignor to Gutehoffnungshutte Oberhausen Aktiengesellschaft, Oberhausen, Germany No Drawing. Application February 13, 1952, Serial No. 271,425

Claims priority, application Germany February 24, 1951

1 Claim. (Cl. 260—604)

The invention relates to a process of oxidation of methane, its homologues, ethane, propane, etc., natural gas mixtures containing the same, and unsaturated analogues such as ethylene, to produce formaldehyde by employment of nitric oxides and alkali borates as solid catalyzer in which the reaction of the gas mixture is carried out under a pressure higher than atmospheric pressure, preferably 1 to 12 atmospheres, and raised temperature in the approximate range of 400° C. to 600° C. in a circulatory method.

Practical tests of this process have demonstrated that the relation in itself apparent and at first used of $$O_2:CH_4 = 1:1$$

thus stoichiometric—can be practically used. Nevertheless it was observed that a reaction process under pressure at a stoichiometric proportion entails difficulties.

The reaction mixture tends to spontaneous exothermic increases of the temperature in the reaction chamber. Thereby local excessive heat developments occur which lead to decomposition of the formed formaldehyde and to the formation of $CO_2$, $CO$ and $H_2$ as by-products. Such decomposition is found to be reduced if the ratio $O_2:CH_4$ is lowered.

In a surprising manner it was found that the formaldehyde production was favored by setting the ratio $O_2:CH_4$ at a value in the range between 0.5 and 0.3.

Although thereby the $O_2$-partial pressure in the reaction mixture which flows to the circulating mixture is correspondingly lessened, the formaldehyde quantity obtained under the same reaction conditions for each cm.² cross section of the reaction chamber increases by 20–25%. It is apparent that by the practical carrying out of the process energy is saved as well for the transportation of the necessary oxidizing medium as for the heating of the reaction mixture.

The process according to the invention is also applicable to the lower, that is, the saturated as well as the unsaturated members of the paraffine series.

Example

A mixture of methane, air and small quantities of 0.04% nitric oxides related to the total circulating volume is circulated through a reaction furnace at a temperature of 510° C. and pressure of 5 atm. higher than atmospheric pressure which was charged with a catalyzer consisting of sodium borate and was heated from the outside. The speed of the reaction mixture was about 40 cm./sec. At a volume proportion of oxygen to methane equal to 1:1 the hourly production amounted to 82.0 gr. HCHO per hour.

Following exactly the same procedure as this control run, that is, passing a gas mixture of air and methane containing 0.04 volume percent of nitric oxides at a temperature of 510° C. and pressure of 5 atmospheres above atmospheric at a flow rate of 40 cms. per second but varied in oxygen to methane ratio from the control to a ratio of 0.5 volume of oxygen to 1 volume of methane and passed over the same catalyst, the hourly production was 98.9 grams of formaldehyde. By comparison, it will be noted that the yield at this lower ratio is 20.7% higher than the control wherein equal volumes of air and methane were used.

Having now fully described the invention what is claimed as new and desired to be secured by Letters Patent is:

Process of oxidizing lower aliphatic hydrocarbon gas consisting essentially of methane gas to a formaldehyde containing gas comprising passing a mixture of oxygen and said gaseous hydrocarbon at a volume ratio between 0.5 and 0.3 volumes of oxygen per volume of said hydrocarbon gas together with a relatively small quantity of oxides of nitrogen at raised pressure between 1 and 12 atmospheres above atmospheric and at a temperature in the approximate range of 400 to 600° C. over a solid catalyst comprising alkali metal borate.

References Cited in the file of this patent

UNITED STATES PATENTS

| Number | Name | Date |
|---|---|---|
| 1,978,621 | Burke | Oct. 30, 1934 |
| 2,042,134 | Walker | May 26, 1936 |
| 2,244,210 | Nashan | June 3, 1941 |
| 2,376,668 | Derby | May 22, 1945 |
| 2,467,993 | Rossman | Apr. 19, 1949 |
| 2,577,053 | Walker | Dec. 4, 1951 |